United States Patent [19]
Karkov

[11] 3,925,096
[45] Dec. 9, 1975

[54] METHOD OF PRODUCING RESIN-CONTAINING PIGMENT PREPARATIONS

[76] Inventor: Otto Karkov, Hojelse Gamle Skole, Lille Skensved, Denmark

[22] Filed: May 18, 1973

[21] Appl. No.: 361,667

Related U.S. Application Data

[63] Continuation-in-part of Ser. No. 757,107, Sept. 3, 1968, abandoned.

[52] U.S. Cl. ............ 106/309; 106/20; 106/308 M; 260/42.54; 260/42.55; 427/221
[51] Int. Cl.$^2$... C08J 3/20; C09C 3/10; C09D 17/00
[58] Field of Search .......................... 106/19–32, 106/193, 308 Q, 309; 117/100; 260/29.6 PM, 37–41.5, 29.6 MH, 42.54, 42.55; 427/221; 241/15, 21, 30

[56] References Cited
UNITED STATES PATENTS
2,649,382  8/1953  Vesce ........................... 106/22 X
3,353,974  11/1957  Trimble et al. ...................... 106/31

*Primary Examiner*—Joan E. Welcome
*Attorney, Agent, or Firm*—Lawrence Rosen; E. Janet Berry

[57]  ABSTRACT

A method of producing a particulate resin-containing pigment preparation is described, in which a linear polymer resin is subjected to a milling, grinding or similar mechanical treatment in the presence of a pigment, water, and an organic solvent or mixture of solvents, the said solvent or solvent mixture being soluble in, but incapable of dissolving the said resin.

Pigment preparations are also described, comprising a powder or a granular mass of a linear polymer resin, containing pigments finely dispersed therein, the pigments amounting to at least 70% of the total weight of resin and pigment.

3 Claims, No Drawings

METHOD OF PRODUCING RESIN-CONTAINING PIGMENT PREPARATIONS

This application is a continuation-in-part of application Ser. No. 757,107, filed Sept. 3, 1968, now abandoned.

This invention relates to a method of producing readily dispersible powdery or particulate resin-containing pigment preparations, and to the said pigment preparations as such.

The products of the invention are of the kind called predispersed pigments, which are of growing importance as raw materials in the production e.g. of printing inks, of paints and varnishes, and in the coloring of plastics as labor costs rise and quality requirements increase.

Various methods for the production of predispersed pigments are known, viz:

1. production of chips by heavy-duty milling on two-roll rubber mills to mill dry pigment and resin together to sheets which are subsequently disintegrated to chips, 2. grinding of dry pigment into a resin solution on e.g. a sigma-blade dough mixer, starting with a high-viscous resin solution and later adding more solvent to form a paste of low viscosity which can easily be removed from the mixer, and 3. grinding in the said mixer of an aqueous pigment filtercake with a liquid resin or a resin solution in the socalled flushing process to make the pigment leave the aqueous phase and enter into the organic phase, after which surplus of water is decanted off, and the remaining mass is ground in vacuo to remove residual water and to get maximal grinding.

Unlike the flushing process, heavy-duty milling does not develop any more tinting strength than do conventional dry color milling processes. Flushing catches the pigment before it has agglomerated into dry casehardened particles, a process which once done, cannot be undone. Heavy-duty milling simply gives dry pigment the best vehicle-wetting properties possible, and thereby develops the maximum in gloss and transparency.

According to U.S. Pat. No. 2,649,382, predispersed pigments are produced by milling the pigment and plastic for a substantial period of time in a liquid grinding medium consisting essentially of water and a liquid organic water-miscible solvent in which the plastic is at least partially soluble, the water and the solvent being present in such proportion that the liquid grinding medium does not dissolve a substantial amount of the plastic and does not cause substantial agglomeration of the plastic, the liquid grinding medium being present at all times in such amount as to give a fluidity to the mixture which permits effective milling action, continuing the milling operation until a dispersion of pigment in plastic is obtained, and thereafter separating the solid portion from the liquid portion of the milled mixture.

The specification states as an essential feature of the invention that the pigment and plastic are mixed with a liquid grinding medium comprising water and a water-miscible solvent for the solid organic plastic employed, such water-miscible solvents including alcohols as, for example methyl, ethyl, isopropyl alcohol, dioxane, glycol ethers as, for example the cellosolves and the carbitols, esters such as cellosolve acetates and methyl or ethyl lactate, and ketones such as acetone and methyl-ethyl ketone, and also states that such solvent must be at least partially soluble in water.

One object of the present invention is to provide a method for the production of pigment preparations in a substantially cheaper way than the known ones, and where a higher percentage of pigments is attained without deterioration as to the quality of the resulting preparations.

Another object is to provide a method by means of which the pigment preparations are obtained directly in powdery form or in an easily pulverizable form.

These and other objects in view will be better understood by those skilled in the art upon consideration of various features of the invention as specified in the following.

In its broadest aspect, the method of producing a particulate resin-containing pigment preparation according to the invention comprises a mechanical treatment of a linear polymer resin in the presence of a pigment, water, and an organic, water-immiscible solvent or mixture of solvents being soluble in, but incapable of dissolving the said resin.

It has been found that the desired preparations can be obtained in this manner using a much smaller proportion of organic solvent than in the known processes and either with a less powerful mechanical treatment or a mechanical treatment of shorter duration or both. Moreover, by using the same amount of mechanical treatment, pigment preparations having a higher proportion of pigments can be obtained than in the known methods, for instance preparations containing 75-80% pigment or more.

The resins to be used in the present method are soluble linear polymers which are able to dissolve and swell with the organic, water-immiscible solvent or solvent mixture, because they are the only ones, which under swelling are able to take up appreciable amounts of organic solvent without becoming sticky. Examples of such resins are polyvinylbutyral, polyacrylic resins, rubber, chlorinated rubber, ethylcellulose, nitrocellulose, cellulose acetate, polyesters, polyamides, and vinyl resins.

The organic solvent or solvent mixture must be water-immiscible, meaning that it should be practically insoluble in water and separate substantially totally if one attempts to mix it with water.

The pigment preparation will in many cases be obtainable directly in powder form, whereas in other cases it is obtained as grains or lenticular particles which are easily ground to powder or may even be directly applicable in that form.

The water serves only to facilitate the grinding and to secure that discrete particles or grains are obtained.

Owing to the choice of solvents, the phase system in the present process differs from that of the above described known process. In the present process, one phase consists of water and another of resin and solvent containing pigment dispersed therein. In the known process there is an aqueous organic solvent phase in equilibrium with a pigment-resin phase also containing water and organic solvent.

The mechanical treatment in the present method may be a milling process, using for instance a ball mill, a vibrator mill or an attritor, or it may be performed by using rapidly rotating stirrers, for instance those of Cowles, Grieves or the Kadymill, or using a colloid mill.

Preferably, ball milling is used, since in that case preparations with particularly high pigment contents are obtainable.

By way of example, a pigment preparation according to the invention may be produced by introducing suitable grinding bodies, such as spheres, into a ball mill together with dry pigment or an aqueous pigment paste, and together with an amount of water sufficient to secure that an easily flowing paste is formed in the mill. The ball mill is then closed and allowed to run for a short time, say for half an hour to one hour, in order to homogenize the mixture. Then an organic liquid suitable for the resin to be used is introduced and the mixture is again homogenized. After homogenization, finely pulverized resin is added and the mill is rotated for a suitable number of hours. During the milling process, the pigment, the resin, and the organic liquid separate from the water as irregular particles. On further milling, these particles are squeezed between the balls and become uniform, glossy particles, which as to form can vary from a crystalline flaky powder to granules or lenticular plates freely movable in the water phase. The whole mass can be washed out from the ball mill with water whereby, after filtration, a water wetted product consisting of pigment, resin, and organic liquid is obtained. After evaporation of adhering water and organic liquid, the pigment preparation consisting of finely dispersed pigment incapsulated in resin is obtained. The preparation thus obtained may be ground to powder if desired.

When producing the preparation by means of a rapidly rotating stirrer it is necessary on account of the less intensive mechanical treatment to use a flushing process, the starting material being an aqueous pigment paste. This and, when necessary, an appropriate further amount of water is placed in a vessel after which the mass is homogenized and dispersed by means of the said rapidly rotating stirrer, whereby there is usually added a dispersing agent suitable for the pigment in question and being of a kind the dispersing effect of which can be broken at a later stage of the process. Then pulverized resin is added and stirring is continued for half an hour to one hour. If a dispersing agent has been added, the effect thereof is then broken and a suitable organic liquid is added. Hereby the pigment, the resin, and the organic liquid gather to form small grains, and a water phase is separating in which the grains are freely movable. When the stirring is continued for still another quarter of an hour to half an hour, the pigment will be flushed into the solvent-swelled resin particles being substantially uniformly dispersed therein. The water is filtered off, and adherent water and solvent are removed from the particles by evaporation. After crushing, if necessary, the desired pigment preparation has been obtained.

By reason of the short time of treatment, the production by means of rapidly rotating stirrers offers the possibility of obtaining a greater production capacity than when using a ball mill.

A condition for the above processes proceeding satisfactorily is that the resin is thoroughly swelled by the organic solvent to a softened state, allowing the pigment to become dispersed in the resin. On the other hand, the swelled resin must not become sticky to any noticeable degree, since this would result in the resin particles aggregating into one big lump which could not be worked up.

The applicability of a given solvent or a given mixture of solvents with a given resin can be determined by pouring out an amount of the solvent or mixture of solvents in question upon the resin in question, the same being in powdery condition. The solvent or mixture of solvents must then satisfy i.a. the following conditions, viz. it must disperse into and be absorbed by the resin to form a product from which, by rolling between the fingers, a transparent body of short consistency (low coherence) can be made, and by using a surplus of the liquid, a two-phase system must form, the liquid component of which consists of the pure solvent.

In one embodiment of the present method, a solvent or solvent mixture is used, which satisfies the above conditions.

However, with the wide range of resins, which can be used for the production of pigment preparations according to the invention, it may not always be possible to select a suitable solvent or mixture of solvents in this simple manner. Therefore, it is generally preferable for orientation purposes to apply the solubility parameter value $\delta$ of the solvent or mixture of solvents. The said value $\delta$ is a numerical constant, the dimension of which is $cal^{1/2} \times cm^{3/2}$, and which can be calculated on the base of physical properties of the liquids in connection with the solubility parameter interval of the resin in question with respect to solvents of the class in question. Thus, in an embodiment of the present method, a solvent or mixture of solvents is used, the solubility parameter of which is positioned immediately above or below the solubility parameter interval of the resin in question.

The solubility parameters of most resins cannot be calculated because they are amorphous mixtures of a number of different, partially unknown, molecular species. The parameters, therefore, must be determined experimentally with respect to each kind of solvent. For this purpose the solvents are divided in the following three groups:

Group I comprising weakly hydrogen-bonded solvents such as aliphatic or aromatic hydrocarbons which may be chlorinated or nitrated, Group II comprising moderately hydrogen-bonded solvents such as ethers, esters, and ketones, and Group III comprising strongly hydrogen-bonded solvents such as alcohols, amines, and acids.

The solubility parameter value intervals of resins are generally determined and published by the manufacturer. If not, they can be experimentally determined. The values are usually subject to an uncertainty of 0.4 delta units.

In the case of solvents where the solubility parameter can be calculated, the solubility parameter value of a mixture of two or more liquids belonging to the same group can be calculated by simply proportionating. Some examples illustrates the method.

With respect to solvents of group I, ethyl cellulose has the solubility parameter interval 8.1–11.1. The liquids petrol 100/140 and xylene have the solubility parameter values 7.6 and 8.8, respectively, which means that xylene dissolves ethyl cellulose whereas petrol 100/140 does not. From 85 g of the said petrol and 60 g xylene a mixture can, however, be produced of which the parameter value is $(85 \times 7.6 + 60 \times 8.8):(60 + 85) = 8.1$ which mixture is suitable for use in connection with ethyl cellulose. If the liquids belong to different groups, the useful ratio must be estimated.

Another example is a resin "Vinylite VYHH" which, as far as the information of the manufacturers goes, is a copolymer of vinyl chloride and vinyl acetate and has a solubility parameter interval of 9.3–11.1 with respect to solvents of group I, and 7.8–13.3 with respect to solvents of group II. The group I-solvent xylene has the solubility parameter value 8.8, whereas the group II-liquid methyl-isobutyl ketone has the value 8.4. The latter solvent dissolves Vinylite VYHH whereas xylene does not. Since xylene is placed 0.5 delta units below the solubility parameter value interval of vinylit VYHH with respect to group I and since methyl-isobutyl ketone is placed 0.6 delta units above the lower limit of the interval with respect to group II, it is estimated that 6 parts of xylene and 5 parts of methyl-isobutyl ketone will constitute the correct mixture. Also a mixture consisting of equal parts of the two solvents is suitable. With benzene the same result could have been obtained, but the above named mixture is preferable from a practical point of view because of the low flash-point of benzene which makes the use of this hydro-carbon less desirable. Even other circumstances may influence the choice of solvents.

By way of example of applications of the pigment preparations produced according to the present invention may be mentioned that copolymers of vinyl chloride and vinyl acetate, the so-called "vinyl resins" are suitable as binders in paints and printing inks for gravure for which reason pigment preparations containing vinyl resins are suitable for coloring such paints and printing inks, considerably improved results being obtained as compared to conventional grinding of the pure pigments with a solution of the binding agent. Thus the colored coating obtained is considerably more glossy and transparent. The pigment preparations containing ethyl cellulose are well suited for coloring nitrocellulose varnishes and printing inks, calcium-zinc resinate printing inks, and varnishes and printing inks in which ethylcellulose is used as a binding agent. Pigment preparations containing alcohol-soluble nitrocellulose are well suited for coloring, for instance, such compositions as alcohol-soluble nitrocellulose printing inks, Pigment preparations containing cellulose acetate butyrate are well suited for coloring acryl varnishes.

Pigment preparations suitable for many purposes consist of a powdery or granular mass of resin in which pigments are present in finely dispersed form within the resin particles and in which the pigment contents amount to 70% or more of the total weight of resin and pigment.

As mentioned above, it is advantageous to use preparations having high contents of pigments, especially such high contents as 70%, which increases the possibility of varying the composition of the product such as a paint, varnish, printing ink or colored plastic since a given final pigment content can be maintained even when a greater addition of binding agents or additives are required. When producing pigmented paints, varnishes, printing inks, plastics or plastic-wares, the resin-containing pigment preparation produced according to the present invention is dispersed in ground condition or without previous grinding in the binding agent in question or in one or more of the components thereof (in which latter case the manufacture of the pigmented product must later on be completed by addition of the remainder of the components). If the pigment preparation is used in ground form, a grain size of 20–500 $\mu$ is in many cases sufficient which can be obtained easily and cheaply. If used in the form of grains or in lenticular form a particle size of 3–4 mm should generally not be exceeded.

Pigmented paints, varnishes, printing inks, and plastic produced by the above method exhibit a far better utilization of the pigments than do corresponding products pigmented by means of dry pigments. Thus the colour is brighter and has no grainy structure. This difference is recognizable even if the dispersion process used in the production (thereby using a pigment preparation produced according to the invention) has been accomplished by stirring with a rapidly rotating stirrer for more than 15 minutes. Comparable dry pigment powders must be dispersed in the same dispersing agent by a process consisting in grinding for two days in a ball mill.

The following Examples are illustrative of the pigment preparations of the invention and their production.

EXAMPLE 1

Into a 5 liter ball mill are introduced 1000 g of phthalocyanine blue filtercake containing 30% $\beta$-copper-phthalocyanine (C.I. Pigment Blue 15), 800 g of water, and 7000 g of steel balls (1.7 cm in diameter). The ball mill is closed, and the contents are milled for half an hour after which 40 g of xylene are added and the milling is continued for one further hour whereafter 100 g Mowital B 30 H (the Mowital B's are powdery polyvinylbutyrals produced by Hoechst) are added.

Milling is then resumed for further 16–20 hours, after which the mill is washed out with water, and the resulting product is isolated by filtration and drying.

There is obtained 395 g of pigment preparation in the form of glossy chips having a diameter of about 1 mm. In this Example, crystallisation-stabilized $\alpha$-copper-phthalocyanine may be substituted for the same amount of $\beta$-copper-phthalocyanine if at the same time the proportion of xylene is increased from 40 to 50 g.

EXAMPLE 2

Into a 5 liter ball mill are introduced 300 g of phthalocyanine green (C.I. Pigment Green 7), 1500 g of water, 100 g of Mowital B 30 T and 7000 g of steel balls (diameter: 1.7 cm) after which the ball mill is closed and milling proceeds for 6 hours. Then 100 g of xylene are added and the milling is resumed for 16 hours after which the mill is washed out with water, and the product is filtered and dried. There is obtained 395 g of a dark powder consisting of 75% pigment and 25% polyvinylbutyral.

EXAMPLE 3

Into a 5 liter ball mill are introduced 300 g of Lithol ruby (C.I. Pigment Red 57/Ca), 1500 g of water, 75 g of xylene, and 1500 g steel balls (diameter: 1.7 cm). The ball mill is run for 1–2 hours after which 100 g of Mowital B 30 H are added. After further running of the ball mill for 16–20 hours the product is sluiced out of the mill, filtered off, and dried, yielding 395 g of lenticular chips having a diameter of 2–3 mm. These chips, consisting of 75% pigment and 25% polyvinylbutyral, are easily pulverized. In this Example, lake red C (C.I. Pigment Red 53/Ba) or a Lithol red 2BM (C.I. Pigment Red 48/Mn) may be substituted for Lithol ruby.

EXAMPLE 4

Into a 5 liter ball mill are introduced 300 g of benzidine yellow G.R. (C.I. Pigment Yellow 13 ), 1500 g of water, 100 g of Pioloform BL 18 (a polyvinylbutyral produced by Vacker), and 7000 g of steel balls (diameter: 1.7 cm). The ball mill is closed and run for 1–2 hours after which 60 g of xylene are added and the mill again run for 16–20 hours. The resulting product is sluiced out with water, filtered off, and dried, yielding 395 g of lenticular chips, diameter ½–1 mm.

EXAMPLE 5

Into a 5 liter ball mill are introduced 300 g of carbon black (C.I. Pigment Black 7), 1600 g of water, 100 g of Mowital B 30 H, and 7000 g of steel balls (diameter: 1.7 cm). the ball mill is closed and run for 1–2 hours after which 100 g of xylene are added, and the mill is again run for 16–20 hours. The resulting product is sluiced out from the mill with water, filtered off, and dried. There is obtained 395 g of pigment preparation in the form of glossy grains (½ mm) consisting of 75% pigment and 25% Mowital B 30 H.

EXAMPLE 6

Into a 5 liter ball mill are introduced 450 g of phthalocyanine blue ($\beta$-copper-phthalocyanine) (C.I. Pigment Blue 15), 1450 g of water, and 7000 g of steel balls (diameter: 1.7 cm). The ball mill is closed and run for 1 hour after which 75 g of xylene and 75 g of methyl isobutyl ketone are added. Grinding is continued for 1 hour after which 150 g of Vinylite VYHH (a powdery copolymer of vinyl chloride and vinyl acetate produced by Union Carbide and Carbon Corporation) are added. The ball mill is now run for 16–20 hours after which the resulting product is sluiced out with water, filtered off, and dried. There is obtained 594 g of a dark powder consisting of 75% of pigment and 25% of the vinyl resin.

EXAMPLE 7

Into a 5 liter ball mill are introduced 450 g of permanentgelb HR (C.I. Pigment Yellow 83) (a benzidine yellow produced by Hoechst), 1350 g of water, 75 g of xylene, 75 g of methyl isobutyl ketone, and 7000 g of steel balls. The ball mill is closed and run for 1–2 hours after which 150 g of Vinylite VYHH are added. Grinding is continued for 16–20 hours after which the ball mill is opened, and the resulting product sluiced out with water, filtered off, and dried. There is obtained 594 g of a yellow powder consisting of 75% pigment and 25% vinyl resin.

EXAMPLE 8

Into a 5 liter ball mill are introduced 300 g of Lithol red BM (C.I. Pigment Red 48/Mn, 1500 g of water, 100 g of Vinylite VYHH, and 7000 g of steel balls (diameter: 1.7 cm). The ball mill is closed and run for 4 hours after which 150 g of benzene are added. After further milling for 20 hours, the ball mill is opened, and the product is sluiced out with water, filtered off, and dried. There is obtained 396 g of granules of a diameter in the ½–1 mm range and consisting of 75% pigment and 25% vinyl resin. The granules are easily pulverized.

EXAMPLE 9

Into a 5 liter ball mill are introduced 300 g of benzidine yellow GG (C.O. Pigment Yellow 17), 1500 g of water, 100 g of Vinylite VYHH, and 7000 g of steel balls. The ball mill is run for 1–2 hours after which 50 g of xylene and 50 g of methyl isobutyl ketone are added. After continued milling for 16 hours, the ball mill is opened and the resulting product is sluiced out with water, filtered off, and dried. There is obtained 396 g of a glossy, coarse powder, consisting of 75% pigment and 25% vinyl resin. The granules are easily pulverized.

EXAMPLE 10

Into a 5 liter ball mill are introduced 300 g of phthalocyanine green (C.I. Pigment Green 7), 1500 g of water, 100 g of Vinylite VYHH, and 7000 g of steel balls. The ball mill is closed and run for 2 hours after which 50 g of xylene and 50 g of methyl isobutyl ketone are added. The ball mill is then run for further 16–20 hours after which the resulting product is sluiced out with water, filtered off, and dried. There is obtained 395 g of dark chips having a diameter ranging between 1 and 2 mm and consisting of 75% pigment and 25% vinyl resin.

EXAMPLE 11

Into a 5 liter ball mill are introduced 200 g of pyrazolon orange (C.I. Pigment Orange 34), 1500 g of water, 400 g of Vinylite VYHH, and 7000 g of steel balls (diameter: 1.7 cm). The ball mill is closed and run for 2 hours. Then 70 g of xylene and 70 g of methyl isobutyl ketone are added. The milling is continued for further 16–20 hours after which the resulting product is sluiced out with water, filtered off, and dried. There is obtained 594 g of lenticular chips having a diameter of 2–3 mm and consisting of 1⁄6 pigment and ⅔ vinyl resin.

EXAMPLE 12

Into a 5 liter ball mill are introduced 300 g of carbon black (C.I. Pigment Black 7), 1500 g of water, 65 g of xylene, 65 g of methyl isobutyl ketone, and 7000 g of steel balls. The ball mill is run for 1–2 hours after which 300 g of Vinylite VYHH are added. After further 1 hour milling, 25 g of methyl isobutyl ketone are added. The milling is continued for further 16–20 hours after which the ball mill is sluiced out with water, and the resulting product is removed by filtration and dried. There is obtained 594 g of granules measuring ½–1 mm and consisting of 50% pigment and 50% resin. The granules are easily pulverized.

EXAMPLE 13

Into a 5 liter ball mill are introduced 375 g of benzidine yellow GR (C.I. Pigment Yellow 13), 1500 g of water, 125 g of ethyl cellulose in the form of powder (Hercules), and 7000 g of steel balls. The ball mill is closed and run for 1 hour. 85 g of petrol, 100/140°C, are added and the ball mill is further run for half an hour after which 50 g of xylene are added. Milling is now continued for 16–20 hours after which the resulting product is sluiced out with water, filtered off, and dried. There is obtained 495 g of crystalline powder consisting of 75% pigment and 25% ethyl cellulose.

EXAMPLE 14

Into a 5 liter ball mill are introduced 400 g of phthalocyanine blue ($\beta$-copper phthalocyanine) (C.I. Pigment Blue 15), 1700 g of water, 100 g of xylene, and 7000 g of steel balls. The ball mill is closed and run for 1 hour. 100 g of ethyl cellulose are added. Milling is continued for 16–20 hours after which the product produced is washed out with water, filtered off, and dried. 495 g of a crystalline powder consisting of 80% pigment and 20% ethyl cellulose are obtained.

EXAMPLE 15

375 G of Lithol ruby (C.I. Pigment Red 57/Ca), 1550 g of water, 125 g of ethyl cellulose, and 7000 g of steel balls are introduced into a 5 liter ball mill. After milling for 1 hour, 120 g of petrol 100/140 are added and the milling is continued for half an hour, after which 50 g of benzene are added. The ball mill is now run for further 16–20 hours, after which the resulting product is washed out with water, filtered off, and dried, yielding 495 g of a crystalline powder consisting of 75% pigment and 25% ethyl cellulose.

EXAMPLE 16

300 G of phthalocyanine blue ($\beta$-copper phthalocyanine) (C.I. Pigment Blue 15), 1200 g of water, 7000 g of steel balls, and 60 g of benzene are introduced into a 5 liter ball mill. The mill is run for 1 hour, after which 100 g of cellulose acetate butyrate, ½ sec. (Eastman) are added. Milling is now continued for 16–20 hours, after which the resulting product is sluiced out with water, filtered off, and dried. There is obtained 396 g of fine chips consisting of 75% pigment and 25% cellulose acetate butyrate.

EXAMPLE 17

300 G of phthalocyanine blue ($\beta$-copper phthalocyanine) (C.I. Pigment Blue 15), 1500 g of water, and 154 g of nitrocellulose RF 10, 65% (ethanole wetted nitrocellulose from Bofors) are stirred up into a glass containing 3 liters by means of a rapidly rotating stirrer. While still continuing the stirring, the following constituents are added in the order mentioned: 70 g of xylene 30 g of dibutyl phthalate, and 70 g of methyl isobutyl ketone. The mixture is poured into a 5 liter ball mill, and 7000 g of steel balls are added, after which the ball mill is run for 16–20 hours. The resulting product is sluiced out of the mill with water, filtered off, and dried. There is obtained 325 g of a dark powder consisting of 70% pigment, 23% nitrocellulose, and 7% dibutyl phthalate.

EXAMPLE 18

187.5 G of aqueous phthalocyanine green filtercake (C.I. Pigment Green 7), 32%, are stirred in a Greave's mixer with a solution of 6 g diamine BG (a fatty alkyl diamine produced by Liljeholmens Stearinfabrik AB), and 3 g glacial acetic acid in 50 g water. Stirring is continued to 20 minutes. Then 90 g Vinylite VYHH are added and stirring is intensified for 20 minutes. While continuing the stirring, 40 g of xylene and 40 g of methyl isobutyl ketone are added and stirring is continued for further 20 minutes. 25 Ml sodium hydroxide solution, 2N, are added in the course of 5 minutes, after which stirring is continued for further 20 minutes. The resulting product is removed by filtration, washed, and dried. There is obtained 152 g of a dark powder consisting of about 39% pigment and about 58.5% vinyl resin.

EXAMPLE 19

55.5 Kg phthalocyanine blue filtercake, 36%, ($\beta$-copper phthalocyanine) (C.I. Pigment Blue 15), 100 kg water, and 1 kg aerosole TR (a dispersing agent produced by Hardman & Holden) are stirred by means of a rapidly rotating agitator (—Greaves). 30 Kg Vinylite VAGH are added, and agitation is continued for 20 minutes. While still continuing agitation, a mixture of 0.44 kg sulphuric acid, 98%, and 2 kg water are added in the course of 5 minutes, after which agitation is continued for further 20 minutes. While stirring is still continued, a mixture of 13 kg xylene and 13 kg methyl isobutyl ketone are added in the course of 10 minutes, after which stirring is continued for further 30 minutes. The resulting powder is filtered, washed, and dried. There is obtained 44 kg powder consisting of 40% pigment and 60% vinyl resin.

EXAMPLE 20

975 G Permanentgelb HR-filtercake, 27.7%, (C.I. Pigment Yellow 83) and 325 g water are stirred in a Greave's mixer. 90 g Vinylite VYHH are added, and stirring is continued for 20 minutes. While the stirring is still continued, a mixture of 60 g xylene and 60 g methyl isobutyl ketone are added, and stirring continued for further 50 minutes. The resulting product is filtered off, washed, and dried. There is obtained 354 g powder consisting of 75% pigment and 25% vinyl resin.

EXAMPLE 21

120 G of carbon black (C.I. Pigment Black 7) and a mixture of 90 g xylene and 90 g methyl isobutyl ketone are mixed by means of a spatula, and the mixture is left in the container of a Cowles' dissolver for 24 hours with the cover closed. 1000 G of water are added. The mixture is stirred for 5 minutes, after which 180 g of Vinylite VYHH powder are added in the course of 5–10 minutes, while still stirring, the stirring being continued for further 30 minutes. The resulting product is filtered, washed, and dried. There is obtained 297 g black powder consisting of 40% pigment and 60% vinyl resin.

EXAMPLE 22

283 G of aqueous benzidine yellow GG filtercake, 21.2%, (C.I. Pigment Yellow 17) and a solution of 6 g fat amine OL and 3 g glacial acetic acid in 110 g of water are stirred in a Greaves' mixer. 120 G of Vinylite VYHH are added, after which agitation is continued for 20 minutes. While still stirring, a mixture of 50 g water and 20 ml sodium hydroxide solution, 2M, is added after which agitation is continued for 20 minutes. While still agitating, a mixture of 35 g xylene and 35 g methyl isobutyl ketone are added, and stirring is continued for 20 minutes. The resulting product is filtered, washed, and dried. There is obtained 180 g yellow powder consisting of about 32% pigment and about 65% vinyl resin.

EXAMPLE 23

253 G of aqueous permanent carmine FBB extra, in the form of a filtercake containing 23.7% pigment (C.I. Pigment Red 146), 250 g of water, and 120 g of Vinylite VYHH are stirred in a Greaves' mixer, and stirring is continued for 20 minutes, after which a mixture of 46 g xylene and 46 g methyl isobutyl ketone are added in the course of 5–10 minutes with stirring, which is then continued for 30 minutes. The resulting product is filtered off and dried. There is obtained 178 g red powder consisting of 33 1/3% pigment and 66 2/3% vinyl resin.

EXAMPLE 24

338 G of aqueous benzidine yellow GR filtercake (C.I. Pigment Yellow 13), 26.6%, and a solution of 9 g fat amine OL/(Liljeholmens Stearinfabrik AB) and 4 ½ g glacial acetic acid in 170 g water are stirred in a Greaves' mixer, after which 90 g of ethyl cellulose are added, and stirring is continued for 20 minutes. While still stirring, 9 g ammonia, 25%, and 250 g water are added in the course of about 5 minutes, after which stirring is continued for 20 minutes. Still stirring, 59 g of petrol 110/140 are added followed by 41 g xylene, after which stirring is continued for 30 minutes. The product resulting is filtered off washed, and dried, whereby 185 g yellow powder consisting of about 48.5% ethyl cellulose and 48.5% pigment is obtained.

EXAMPLE 25

278 G of aqueous phthalocyanine blue filtercake ($\beta$-copper phthalocyanine) (C.I. Pigment Blue 15), 5 g of aerosole TR, and 500 g of water are stirred in a Greaves' mixer, 100 g of Mowital B 30 H are added, and stirring is continued for 20 minutes. Still stirring, 11 ml of sulphuric acid, 2M, are added, and stirring is continued for 20 minutes. Now 110 g of xylene are added within 5 minutes, and stirring is continued for 30 minutes. The resulting product is filtered off, washed and dried. There is obtained 198 g dark powder consisting of 50% pigment and 50% polyvinylbutyral.

EXAMPLE 26

In a 1250 liter ball mill there are introduced 120 kg steel balls (diameter: 1.7 cm), 75 kg phthalocyanine blue (C.I. Pigment Blue 15), and 100 kg water. The ball mill is closed and run for 1 hour. After this, 275 kg of water are added, and milling is continued for half an hour. 8 kg of xylene are added, milling is continued for 1 hour, and 25 kg of Mowital B 30 H are added. The ball mill is now run for 16 hours at 20°–30°C, after which the resulting product is washed out of the mill, filtered off, washed, and dried. After drying, 98 kg lenticular plates, ½–1 mm in diameter and consisting of 75% pigment and 25% polyvinylbutyral, are obtained.

EXAMPLE 27

Production of nitrocellulose printing ink based on spirits 29 g A
29 g B
8,9 g dibutyl phthalat
16,3 g isopropyl acetate
7,5 g butyl acetate
5 g ethanole are weighed out in a 250 ml tin suitable for use in connection with a small rapidly rotating stirrer. Under agitation 13.3 g pigment preparation produced according to Example 2 and containing 10 g pigment (Phthalocyanine green) are added. In the above prescription the designations A and B refer to a solution of nitrocellulose and a mixture of equal parts of Arochem and ethanol, respectively.

Intensive agitation is continued for 15 minutes, after which ethanol is added for the purpose of dilution until the viscosity is 25–30 seconds measured on the DIN-cup No. 4, has been attained, which required about 43 g of ethanol.

For the purpose of comparison with the printing ink thus produced, another printing ink having the same proportion of the same pigment is produced by using the pigment in the form of powder. This is accomplished by introducing the following constituents in a ball mill:

10 g phthalocyanine green
40 g A
20 g B
8 g dibutyl phthalat
15 g isopropyl acetate
7 g butyl acetate
300 g ceramic balls after which the ball mill is activated and remained agitated for 48 hours. Then the milled product is diluted with ethanol in the same manner as above described to obtain the viscosity of 25–30 seconds made on DIN-cup No. 4.

When the two printing inks are printed adjacent to each other on various materials such as aluminium foil, cellophane and paper, it will be found that the former is considerably more glossy and transparent than the latter.

What I claim is:

1. Method of producing a particulate resin-containing pigment preparation, comprising ball-milling an organic solvent-soluble, linear polymer resin in the presence of at least 70% by weight of pigment based on the total weight of resin and pigment, water, and an organic water-immiscible solvent or mixture of solvents being soluble in, but incapable of dissolving the said resin, said solvent or solvents being used in amounts sufficient to be homogeneously taken up by said polymer resin to form a swollen, coherent, non-sticky, soft polymer resin.

2. Method according to claim 1, in which an organic solvent or mixture of organic solvents is used, the solubility parameter value of which is positioned immediately above or below the solubility parameter interval of the resin.

3. A particulate resin-containing pigment preparation according to the method of claim 1.

* * * * *